United States Patent [19]
Hopkins

[11] 3,864,930
[45] Feb. 11, 1975

[54] CONTROL FOR ABSORPTION REFRIGERATION SYSTEM

[75] Inventor: Neil E. Hopkins, York, Pa.

[73] Assignee: Borg-Warner Corporation, Chicago, Ill.

[22] Filed: Dec. 5, 1973

[21] Appl. No.: 421,897

[52] U.S. Cl............... 62/101, 62/141, 62/148, 62/476, 62/119
[51] Int. Cl............................. F25b 15/06
[58] Field of Search ......... 62/101, 141, 119, 148, 62/476

[56] References Cited
UNITED STATES PATENTS
| | | | |
|---|---|---|---|
| 3,276,217 | 10/1966 | Bourne et al. | 62/101 |
| 3,640,084 | 2/1972 | Hopkins et al. | 62/476 X |
| 3,744,265 | 7/1973 | Bawel | 62/141 |

Primary Examiner—William F. O'Dea
Assistant Examiner—Peter D. Ferguson
Attorney, Agent, or Firm—Thomas B. Hunter

[57] ABSTRACT

Controls for an absorption refrigeration machine which is constructed to operate in a normal manner wherein an absorbent solution is utilized as the driving force to absorb vapor released under subatmospheric conditions from a refrigerant, such as water, and also in a mode wherein the cooling water circulated through the absorber tube bundle condenses refrigerant vapor released from the evaporator tube bundle. A pan is located between the normal solution level in the absorber and the absorber heat exchanger which empties into the absorber sump during normal operation but functions as a receiver for refrigerant during the "free cooling" operation. This construction eliminates the requirement for an auxiliary receiver to hold the solution or brine during free cooling operations.

6 Claims, 3 Drawing Figures

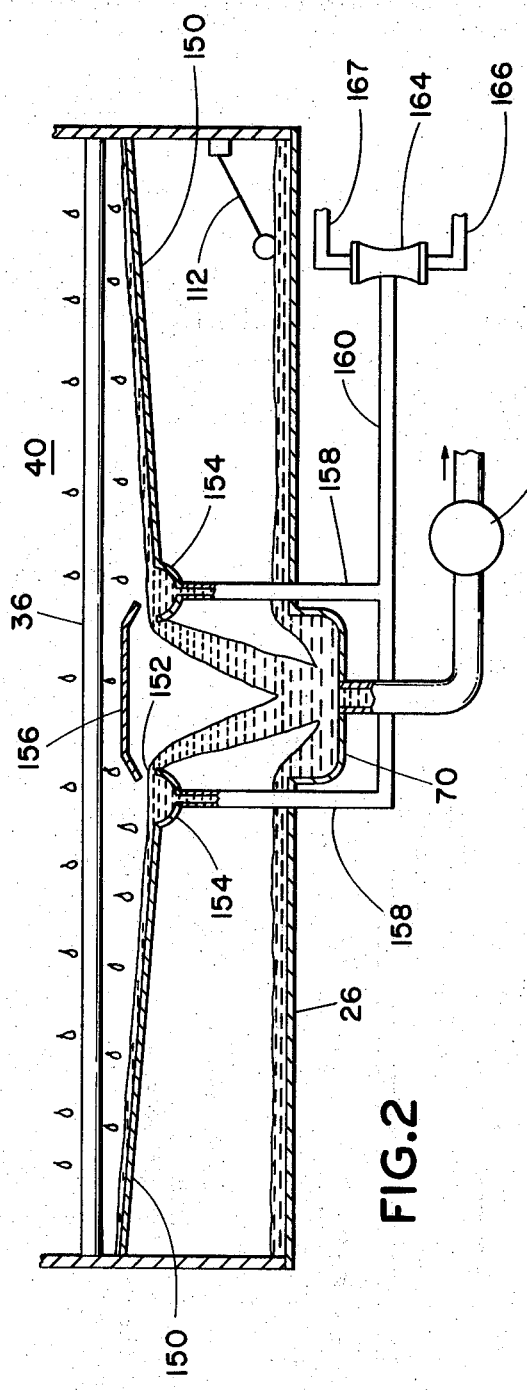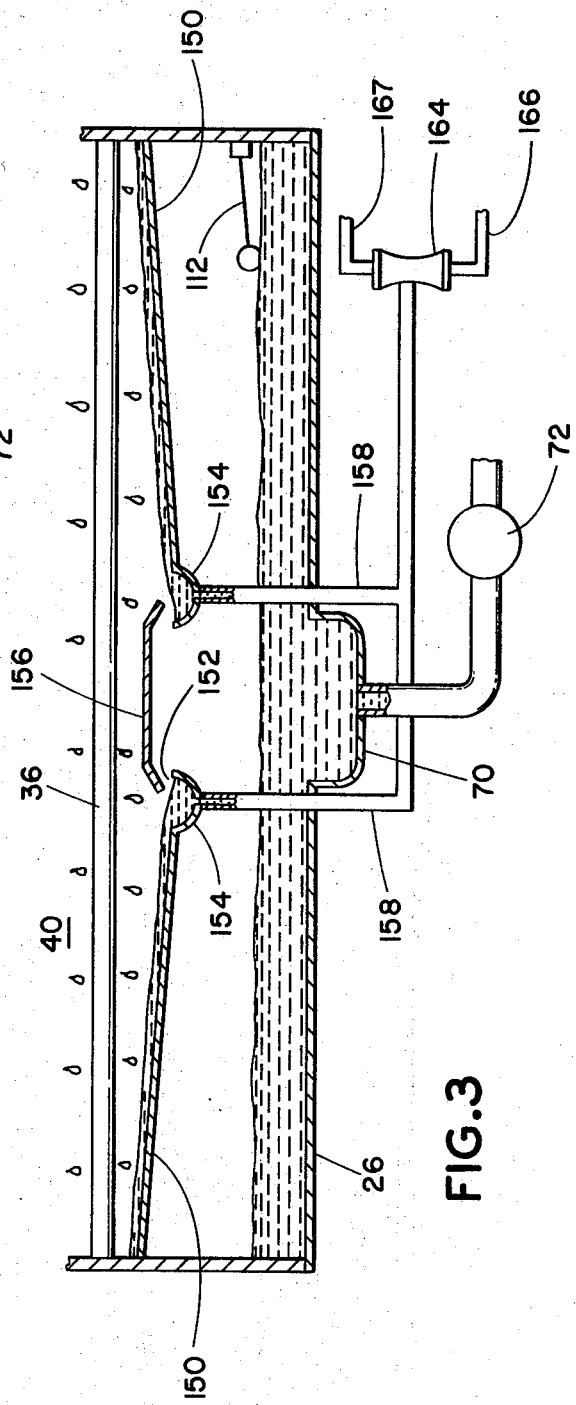

CONTROL FOR ABSORPTION REFRIGERATION SYSTEM

BACKGROUND AND SUMMARY OF THE INVENTION

This invention is an improvement of the system described and claimed in U.S. Pat. No. 3,640,084 entitled "Refrigeration System and Method" issued to N. E. Hopkins et al. on Feb. 8, 1972. In the above identified patent, there is described a refrigeration system of the type normally operated in the conventional absorption refrigeration cycle. When a cooling medium such as cooling tower water is available at temperatures below that which will satisfy the refrigeration load, the refrigeration cycle is suspended by discontinuing the supply of heat to the generator. The absorber is then operated as a condenser to liquify the refrigerant in the evaporator. During the changeover, as explained in considerable detail in the Hopkins et al patent, the brine, usually a hygroscopic solution of lithium bromide or similar salts, is pumped out of the absorber and stored in a receiver. This normally requires about 10 to 15 minutes during the changeover period and requires a rather complicated and expensive piping and holding tank arrangement for transfer and storage of the brine. In any absorption system, the pipes, pumps, valves and other related fluid handling means are of critical importance in that all such systems operate at an extremely low pressure (10 to 100 mm of Hg absolute). It is therefore imperative that all such means be carefully sealed against the admission of atmospheric air which will raise the pressure of the system and place an increased burden on the purging device required to remove the noncondensible gases, principally air.

In co-pending application Ser. No. 421,896, filed concurrently by Neil E. Hopkins, it is proposed to furnish the absorber with a pan inside the evaporator-absorber shell capable of receiving the flow of refrigerant during the free cooling operations and delivering it to the refrigerant circulation system. It is understood that the term "free cooling" is the alternative refrigerant cycle in which the generator is discontinued (except for migration control and blowdown action explained below) and relatively cold water from any source is supplied to the absorber so that it is capable of condensing water vapor released in the evaporator. The pan is designed to allow passage of solution during normal refrigeration operation and prevent passage of refrigerant during free cooling operations. Accordingly, such means prevents substantially all flow of refrigerant to the absorbent solution during the free cooling mode.

The tendency for refrigerant to migrate from the refrigerant circuit to the solution circuit is prevented by using a very small amount of heat to heat the solution approximately 60°F above the refrigerant temperature. This is accomplished by pumping a small amount of solution from the absorber to the generator, to be returned to the absorber sump, and controlling the amount of generator sufficiently to prevent migration of refrigerant. In the present invention, this may be controlled by a float control sensing the solution level in the absorber or controlled by a refrigerant overflow device which comes into action during the free cooling phase, maintaining the refrigerant level in the evaporator pan, and the solution level and concentration in the solution circuit at the proper optimum condition for the free cooling load. Heat is applied to the generator circuit slightly in excess of that required to prevent migration of refrigerant from the refrigerant to the solution circuit, with the resulting tendency to continually build up the refrigerant level in the refrigerant pan, with refrigerant being driven from the solution circuit. Thus the overflow is continually in operation with the small amount of flow and thus maintaining the optimum levels, and, in addition, serving as a blow down from the refrigerant circuit to remove any residual salt.

Of interest is the disclosure in U.S. Pat. No. 3,276,217 issued to J. R. Bourne et al. on Oct. 4, 1966. The Bourne et al patent shows a pan arranged inside the absorber section and discharging solution directly into the solution line. The purpose of this construction is entirely different because the sump portion of the shell is used to store excess solution during normal operation (low load conditions).

DESCRIPTION OF THE DRAWINGS

FIG. 2 is a partial longitudinal section through the lower half of the evaporator-absorber shell showing the system operating under normal cooling conditions; and FIG. 3 is a view similar to FIG. 2 showing the system operating under free cooling conditions.

DETAILED DESCRIPTION OF THE INVENTION

Figure 1:
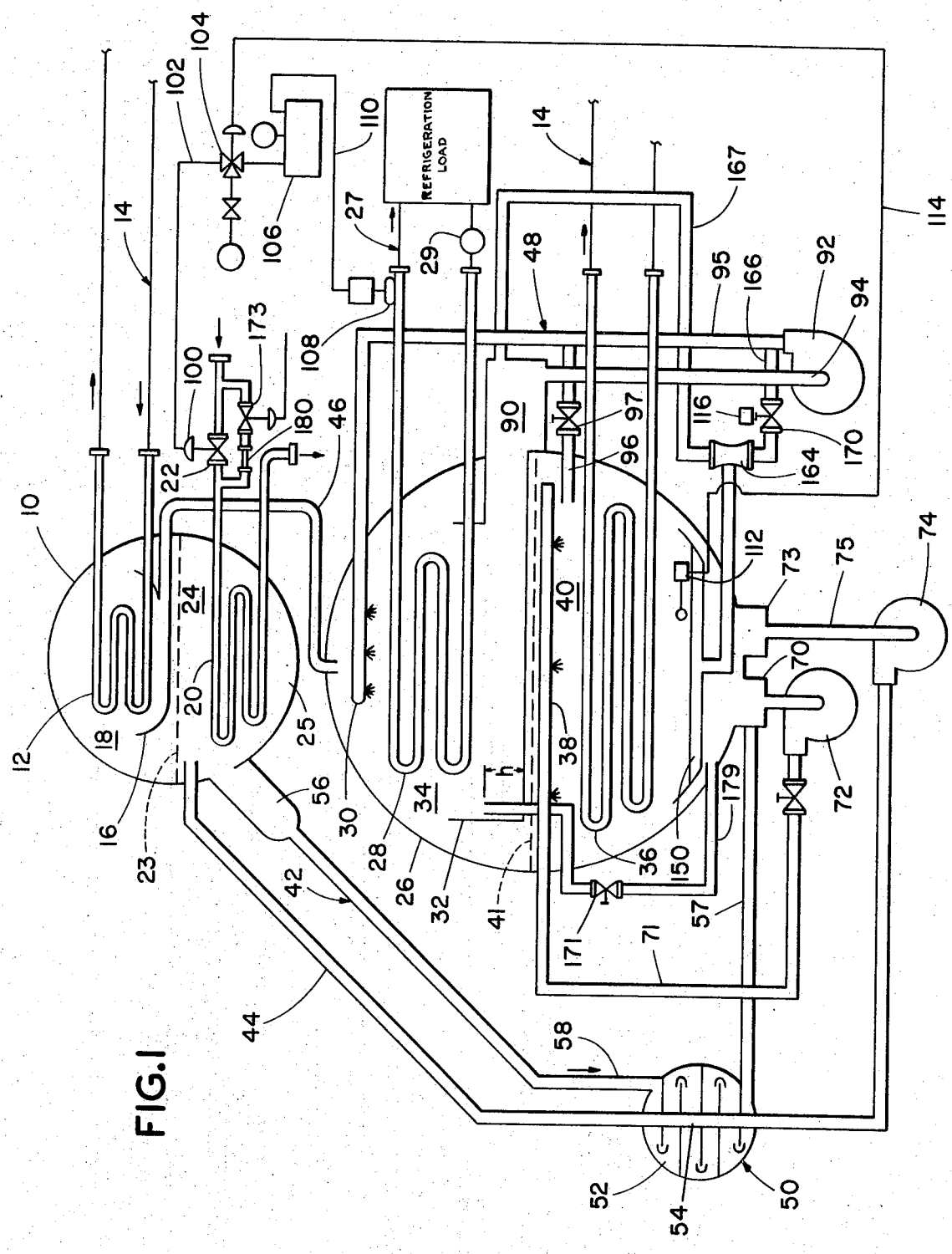
FIG. 1 is a schematic or diagrammatic view showing an absorption refrigeration system constructed in accordance with the principles of the present invention.

Referring to FIG. 1, an upper shell 10 encloses a heat exchanger 12, hereinafter referred to as the condenser coil and forming a portion of a cooling circuit 14. Positioned below condenser coil 12 is a receptacle means in the form of a pan 16 which cooperates with condenser coil 12 and the upper portion of shell 10 to provide a condenser 18.

In the lower portion of shell 10 there is provided a heat exchanger 20, hereinafter referred to as the generator coil, in which flow of a heating medium such as steam or hot water is regulated by a valve 22, the direction of flow being indicated by arrows. Generator coil 20 forms a portion of a heating circuit which also includes pump means as necessary, and a suitable source of heat, neither of which is shown. The lower portion of shell 10 and the generator coil 20 cooperate to provide a generator 24, a generator sump 25 being formed by the lowermost portion of shell 10. A dashed line 23 represents an imaginary plane of demarcation between condenser 18 and generator 24.

A lower shell 26 encloses a heat exchanger 28, hereinafter referred to as the evaporator coil, which forms a portion of a chilling circuit indicated generally at 27 and arranged to circulate chilled fluid to a refrigeration load represented schematically but typically consisting of one or more air conditioning units. Also included is a pump 29. The direction of flow in chilling circuit 27 is indicated by arrows. Positioned above evaporator coil 28 is a refrigerant distribution means in the form of a spray header 30 having spray nozzles arranged to distribute refrigerant over chilling coil 28 in heat exchange relation therewith. Below chilling coil 28 is a receptacle means in the form of a pan 32 for collecting liquid refrigerant. Evaporator coil 28, spray header 30, pan 32, and the upper portion of shell 26 cooperate to provide an evaporator 34.

Below pan 32 there is provided a heat exchanger 36, hereinafter referred to as the absorber coil, which forms a portion of cooling circuit 14, condenser coil 12 being arranged in series with absorber coil 36. A spray header 38 positioned above coil 36 is provided with a number of spray nozzles. Spray header 38, the lower portion of shell 26 and cooling coil 36 cooperate to provide an absorber 40, the nozzles of spray header 38 being arranged to distribute an absorbent solution in the upper portion of absorber 40. A dashed line 41 represents an imaginary plane of demarcation between evaporator 24 and absorber 40.

Condenser 18, generator 24, evaporator 34 and absorber 40 are connected in a closed circuit for conducting the refrigerant and the absorbent solution in an absorption refrigeration cycle. The closed circuit also includes a concentrated solution passage means 42, a dilute solution passage means 44, a condensate line 46, and a refrigerant passage means 48. A shell-and-tube heat exchanger, represented schematically at 50, and referred to hereinafter as the solution heat exchanger, includes a shell side 52 which forms a portion of concentrated solution passage means 42, and a tube side 54 which forms a portion of dilute solution passage means 44. Concentrated solution passage means 42 also includes a concentrated solution receiver 56 communicating with generator 24, and a line 58 connecting concentrated solution receiver 56 with shell side 52 of heat exchanger 50. The dilute solution flows from the shell side 52 of the solution heat exchanger through line 57 to a sump 70 in the absorber. Solution of intermediate concentration is drawn from sump 70 and delivered by absorber pump 72 to spray header 38 through line 71.

Dilute absorbent solution is collected in a sump 73 (spaced from sump 70) at the lower portion of shell 26 and delivered to the inlet side of generator pump 74 through line 75. From there it flows through the tube side 54 of solution heat exchanger and line 44 to the generator.

Condensate line 46 connects pan 16 with evaporator 34 for delivery of condensed refrigerant to the evaporator. Refrigerant passage means 48 connects pan 32 with spray header 30 and includes a refrigerant receiver 90 communicating with pan 32, a refrigerant pump 92, a line 84 connecting refrigerant receiver 90 with the refrigerant pump inlet, and a line 95 connecting the refrigerant pump outlet with spray header 30. A blowdown line 96 communicates at one end thereof with absorber 40. A blowdown valve 97, which is normally closed, is provided to control flow through the blowdown line.

In addition to condenser coil 12 and absorber coil 36, cooling circuit 14 includes a line (not shown) for conducting a cooling medium from absorber coil 36 to condenser coil 12. Cooling water is supplied from any suitable source, such as a cooling tower, and may be controlled or uncontrolled as to temperature. A refrigerant pan level control is supplied for the free cooling load, by the use of line 179 and overflow level at height *h* in the refrigerant pan, with automatic valve 171 open during the free cooling load and closed during the normal cooling load. During the free cooling load, there is a small amount of refrigerant from the evaporator pan overflowing into line 179 and flowing to the solution in the absorber pan. This refrigerant is generated by use of a bypass steam valve located around the main steam valve 22 which is closed during the free cooling load, and with the flow of steam through valve 173 being controlled by a sized orifice 180. The orifice is sized sufficiently to prevent migration of refrigerant vapor from the refrigerant circuit to the solution circuit and, in addition, provides for a migration of vapor in the opposite direction, namely from the solution to the refrigerant circuit. This vapor condenses in the absorber or condenser circuit, or flows as water in the evaporator pan, and thus overflows into the solution circuit for a small amount of clean up blow down.

In general, some of the structure heretofore described is common to a great many existing absorption refrigeration systems. Any number of additional features of modifications may be found in such systems but do not play any part in the present invention and have been omitted for the sake of clarity. Among these, for example, are purge devices for the removal of non-condensible gases from the system, means for decrystallizing salts which may precipitate from solution in the shell side of the heat exchanger under conditions of relatively high concentration, and a solution valve which may be associated with dilute solution passage means for reducing the rate of flow of solution therein at reduced capacities.

In the system described in the aforementioned U.S. Pat. No. 3,640,084, a changeover to free cooling is accomplished by first pumping the absorption solution out of the absorber and storing it in an auxiliary receiver. With the absorber emptied of solution, the lower portion of the absorber evaporator shell is then capable of receiving the refrigerant condensed on the absorber heat exchanger. This refrigerant is then introduced into a refrigerant recirculation system and sprayed over the evaporator heat exchanger where it abstracts heat from the chilled water circuit. This process is continuous so that the refrigerant vapor boiled off in the evaporator is condensed in the absorber section and then directed back to the evaporator.

In the present invention, the auxilliary receiver is eliminated and the absorbent solution is retained in the sump portion of the absorber-evaporator shell. A pan is located underneath the lowest tube section of the absorber heat exchanger and is provided with a discharge opening preferably located over the sump feeding the suction side of the absorber pump. Interposed in the path of solution flow is a trough or other means for intercepting fluid through which the solution must pass on its way to the solution pump. The trough is connected by means of conduits to the refrigerant recirculation system. When the system is functioning during free cooling operations, the refrigerant is collected in the trough and carried back to the refrigerant pump to be introduced into the evaporator sprays. When "normal" operation is resumed, the refrigerant lines to the trough are closed so that the solution simply overflows the trough and spills into the lower portion of the absorber shell where it is picked up by the solution pumps and circulated back to the absorber sprays and the generator.

As best seen in FIG. 2, which shows the operation of the system during the normal absorption cycle, pan 150 extends longitudinally of the absorber tube bundle 36 and is positioned above the highest level of solution expected in the absorber shell and below the lowest tube in the absorber tube bundle. The pan extends from opposite ends of the shell and slopes downwardly toward the center where an opening 152 is provided above the sump or receiver 70 collecting solution for flow to the suction side of the absorber pump 72. Immediately around the opening is a trough or collector 154 into which the solution must flow before it passes through the opening. This trough may be a continuously generally circular form or it may be arranged in any suitable manner to intercept the flow. In the preferred embodiment, a baffle 156 is located over the opening to prevent direct flow of liquid through the opening for a reason to be described in more detail below. The trough 154 is interconnected to the refrigerant circuit by means of conduits 158, 160 and which connect it to the suction side of an ejector 164. The motive fluid for ejector 164 is provided by a tap-off 166 from the discharge side of refrigerant pump 92, and the mixed stream is directed through line 167 to the upper portion of the refrigerant collection pan 90 adjacent the evaporator tube bundle 28. The valve 170 in tap-off line 166 is closed during normal cooling so that the ejector is inoprative. The solution thus overflows the trough 154 spilling into sump 70 and is pumped by absorber pump 72. In this mode the system operates exactly the same as the conventional absorption refrigeration machine.

FIG. 3 is a view similar to FIG. 2 illustrating the flow of solution during free cooling operations. During the free cooling load, the level of solution in the absorber sump is at an intermediate level. The intermediate level provides a compromise between low solution levels and high solution concentrations, in contrast to high solution levels and a low concentration. Maintaining the solution level at an intermediate point provides sufficient refrigerant in the refrigerant circuit for suitable operation, without endangering solution cyrstallization.

The absorber pump is discontinued during the free cooling operation so that the level remains relatively static with solution filling up the receiver or sump and the line leading to the solution pump. Valve 170 in tap-off line 166 is opened to allow fluid to pass to the motive fluid side of ejector 164 where it draws in the stream of refrigerant now being condensed on the absorber tube bundle and raining down into the pan. This refrigerant flows toward the center portion thereof to opening 152 but now it is intercepted by the trough 154 and flows through lines 158, 160 to the ejector. This mixed stream is carried upwardly to the refrigerant pan 32 where it is reintroduced into the refrigeration recirculation circuit.

It is not necessary that the pan collect all of the refrigerant being condensed on the absorber heat exchanger. In practice, some refrigerant will splash down into the absorbent solution stored in the lower portion of the shell. For most efficient operation, however, it is desirable to hold the loss to a minimum. The provision of the baffle 156 will help to some degree and additional baffle arrangements (not shown) around the pan may also be required.

An important aspect of the present invention relates to control means for preventing migration of refrigerant from the refrigerant circuit to the absorber circuit when the system is operating in the "free cooling" mode. This is accomplished by pumping a small amount of absorbent solution from the absorber to the generator and providing a small amount of heat to the generator sufficient to prevent migration of refrigerant. The absorbent solution is then returned from the generator to the absorber in the usual manner. This may be automatically controlled by means of a float switch in the absorber or a level responsive switch in the refrigerant circuit. Alternatively, a small amount of controlled heat input to the generator is supplied during the free cooling load, sufficient not only to prevent refrigerant migration from the refrigerant circuit to the solution circuit but, in actuality, to provide a migration in the opposite direction tending to gradually build up the refrigerant level in the evaporator pan. An overflow in the refrigerant pan controls the level at the optimum point.

As best shown in FIG. 1, a heating medium is supplied to the generator heat exchanger 20 through controlled valve 22. The valve 22 is operated by a conventional pneumatic operator 100 through control line 102, three way valve 104, pneumatic controller 106, control line 110 and thermal responsive bulb 108. The bulb 108 is located on the chilled water line 27 connected to the evaporator heat exchanger 28. Under normal operation. the amount of heat supplied to the generator is a function of the temperature of the chilled water leaving heat exchanger 28. As the temperature in line 27 drops, thereby indicating a reduced load, valve 22 will close to reduce the amount of steam, or other heating medium, delivered to the generator. In the "free cooling" mode it is desirable to provide a small amount of heat sufficient to prevent migration of refrigerant from the refrigerant circuit to the absorber. In the present invention, a float switch 112 is adapted to operate three way valve 104 to transfer control from thermal sensing bulb 108 to a constant pressure source shown just to the left side of three way valve 104. Pneumatic control pressure can be fed through a reducing valve to maintain controlled flow of steam through valve 22 in accordance with the amount of heat needed to prevent migration.

If the overflow arrangement previously described is used, during the free cooling load, valve 22 is closed, valve 173 is open permitting a controlled flow of steam through the valve and orifice 180 as discussed above.

OPERATION

Under normal operation, valve 170, which provides refrigerant at discharge pressure to flow through ejector 164, will be closed. Also, the steam valve 22 will be under the control of temperature sensing element 108 in the chilled water line. In this condition, the absorber will operate in accordance with FIG. 2 with solution spilling over the collectors 154 down into the absorber sump 70. Pump 72 will be in operation to deliver absorbent solution continuously over the absorber coil 36.

When it is desired to convert operations to "free cooling," solenoid 116 is actuated from a remote location to open valve 170 thereby providing fluid to drive ejector 164. The absorber pump 72 is shut off so that the level in the sump of the shell 26 will began to rise. At a predetermined level, float switch 112 will shift control of the steam valve 22 away from response to chilled water temperature and maintain a predetermined, constant flow of steam to the coil, at a much lower rate then is required in normal operation. At the same time, the generator pump 74 is run continuously to supply the generator with a predetermined flow of absorbent solution. Some of the refrigerant will be boiled off in the generator, be condensed on coil 12, and flow back to the refrigerant circuit.

When operating in the "free cooling" mode, the water flowing through coil 36 is cold enough to condense refrigerant boiled off of coil 28 in the chilled water circuit. The condensed refrigerant will drop down on to the pan 150, be intercepted by collectors 154 and flow through to the inlet side of ejector 164 to be returned to the refrigerant receiver 90.

It will be appreciated that the term "free cooling" as used herein does not mean absolutely "free," but rather operation at drastically reduced power input. Some heat must be supplied to the generator to prevent migration, as heretofore described, and several of the pumps must be operated thereby using power.

Although the invention has been shown in connection with one specific embodiment, it will be readily apparent to those skilled in the art that various changes in form and arrangement of parts may be made without departing from the spirit and scope of the invention as defined by the appended claims.

What is claimed is:

1. In a method of controlling refrigeration system of the type having an evaporator and an absorber connected in a closed circuit for normally conducting a refrigerant and an absorbent solution in an absorption refrigeration cycle, the absorber being arranged in the closed circuit to receive refrigerant vaporized in the evaporator and normally being provided with absorbent solution for absorption of the vaporized refrigerant; means defining a chilling circuit for circulating a chilled fluid in heat-exchange relation with a refrigeration load and including a first heat-exchanger in the evaporator for abstracting heat from the fluid and rejecting it to the refrigerant to chill the fluid and to vaporize the refrigerant; and means defining a cooling circuit for circulating a cooling medium and including a second heat-exchanger in the absorber for normally abstracting heat from the absorbent solution and rejecting it to the cooling medium; and a generator supplied with a heating medium to boil off refrigerant from the absorbent solution; the steps of operating the absorber to condense the vaporized refrigerant by circulating the cooling medium in the second heat exchanger at a temperature lower than a temperature of the chilled fluid which will satisfy the refrigeration load; circulating refrigerant condensed in the abosrber to the evaporator; and supplying heating medium to said generator at a reduced rate sufficient to prevent migration of refrigerant to said absorbent solution.

2. A method as defined in claim 1 wherein said heating medium is normally controlled by the temperature of said chilled fluid, and including the additional steps of sensing the level of solution is said absorber and transferring control of said heating medium from the temperature of said chilled fluid to said level of solution.

3. A method as defined in claim 1 including the steps of supplying said heating medium to said generator at a constant rate sufficient to produce some migration of refrigerant from absorbent solution to said circulating refrigerant and transferring excess refrigerant from evaporator to said absorber.

4. An absorption refrigeration system comprising a generator, a condenser, an evaporator and an absorber connected in a closed, absorption refrigeration circuit; a common shell enclosing said evaporator and said absorber and having a lower portion thereof defining a sump; a first heat exchanger associated with said evaporator; a refrigeration circuit adapted to circulate refrigerant over said first heat exchanger and abstract heat from a fluid circulating therein; a second heat exchanger associated with said absorber through which a cooling medium may be circulated, said second heat exchanger being located above said sump; means for withdrawing absorbent solution collected in said sump and transferring at least a portion thereof for circulation over said second heat exchanger; means defining a first fluid flow path for absorbent solution passing over said second heat exchanger to said sump during normal operation of the system; means defining a second, alternate fluid flow path for intercepting condensed refrigerant passing from the surface of said second heat exchanger and directing the same to said refrigeration circuit during the free cooling mode of said system, whereby solution may be stored in said sump during operation when refrigerant is being condensed on said second heat exchanger; a third heat exchanger associated with said generator; means for supplying a heated medium to said third heat exchanger in response to the temperature of said fluid circulating in said first heat exchanger; and means for transferring control away from said heated medium supply means during the free cooling mode and supplying a predetermined flow of heated medium to said third heat exchanger sufficient to prevent migration of refrigerant to said absorbent solution.

5. A system as defined in claim 4 including means responsive to the level of solution in said sump for controlling the supply of heated medium to said third heat exchanger.

6. A system as defined in claim 4 including means for supplying heated medium to said third heat exchanger in excess of that required to prevent said migration and means for transferring excess refrigerant from said evaporator to said sump.

* * * * *